United States Patent [19]
Carroll et al.

[11] 3,713,146
[45] Jan. 23, 1973

[54] CIRCUITRY FOR REMOTELY DISPLAYING RADAR IMAGERY USING A SINGLE DATA CHANNEL

[75] Inventors: John J. Carroll, Calvin A. Hughey, both of Indianapolis; Charles W. May, Martinsville, all of Ind.

[73] Assignee: The United States of America as represented by the Secretary of the Navy

[22] Filed: Jan. 29, 1971

[21] Appl. No.: 110,984

[52] U.S. Cl. .................................................. 343/6 A
[51] Int. Cl. .............................................. G01s 7/04
[58] Field of Search ...................................... 343/6 A

[56] References Cited

UNITED STATES PATENTS

| | | |
|---|---|---|
| 2,982,954 | 5/1961 | Gross .................................. 343/6 A |
| 2,472,535 | 6/1949 | Jones ................................ 343/6 A X |
| 2,795,780 | 6/1957 | Gross et al. ........................... 343/6 A |

*Primary Examiner*—T. H. Tubbesing
*Attorney*—R. S. Sciascia and P. S. Collignon

[57] ABSTRACT

A circuit for remotely displaying radar imagery from the radar circuits at a radar receiving station to a remote point by a single telemetry channel, the circuit having mixers to mix desired video signals on the pedestal level to form the composite video consisting of the blanking level, the pedestal level, and the saturation level, which desired video signals are demodulated and separated at the remote station and applied to a sampler circuit of an azimuth scan generator or phase lock loop and a sweep generator coupled to the remote display tube to display the desired video signals.

5 Claims, 5 Drawing Figures

INVENTORS.
JOHN J. CARROLL
CALVIN ANDREW HUGHEY
CHARLES W. MAY
BY H. H. Losche
ATTORNEYS

INVENTORS.
JOHN J. CARROLL
CALVIN ANDREW HUGHEY
CHARLES W. MAY

BY H. H. Loesle
ATTORNEYS

3,713,146

CIRCUITRY FOR REMOTELY DISPLAYING RADAR IMAGERY USING A SINGLE DATA CHANNEL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to remote display of radar receiver intelligence and more particularly to the real time remote display of radar receiver echo signals of target information.

In the past remote display of radar receiver target signal information has been accomplished by transmitting a picture of the radar display over a standard television channel. This method uses a radar indicator and a television (TV) camera at the radar station. The standard TV channel has the disadvantages that it requires the use of bulky equipment at the radar receiving station.

Another means has been to take moving pictures of the radar display at the radar receiving station, to develop these pictures, and to project these pictures on a screen at the remote station. This means not only requires bulky equipment at the radar receiving station, but does not permit real time display of the radar information.

Another means is to transmit the radar video over one channel, the radar synchronizing trigger over a second channel, and the azimuth coordinate information over a third channel. While this means works well, it requires the use of three separate modulators and information channels when the channel of communication happens to be a radio link.

SUMMARY OF THE INVENTION

In the present invention let it be assumed that the radar station is a receiver for a pulsed type radar scanning in azimuth. The radar video is processed in such a way as to produce the composite video which completely contains the target. There are three voltage levels that are of interest with respect to the composite video, namely: (1) the video blanking level, (2) the video pedestal level, and (3) the video saturation level. There are also three distinct time periods of interest with respect to the composite video, namely: (1) the pulse repetition frequency period, (2) the blanking period, and (3) the azimuth scan period. The pulse repetition frequency (PRF) period is the length of time between successive radar trigger pulses. The blanking period is generated in the radar set and is a varying interval of time beginning with each PRF period during which the composite video is negative. The azimuth scan period is the length of time required by the radar antenna to complete one cycle of the azimuth scan.

The video information signals are amplified and cursors, video symbols, and triggers are mixed with the video signals to produce a composite signal. The video signals are superimposed on the video pedestal while the range cursor or cursors and other video symbols are formed by adding to the pedestal level whereas other cursors, such as the center-of-scan cursor, is formed by driving the video amplifier into saturation. These composite signals are then transmitted over a data link, which may be a conductor or a radio frequency (RF) link, to the remote station wh-re the signals are demodulated and separated to display on a radar scope. The radar synchronizing pulses and/or cursor triggers are used to trigger the horizontal and vertical sweep voltages of the remote radar scope. It is therefore a general object of this invention to provide a real time remote radar display of radar target objects over a single signal channel of composite video signals utilizing the pedestal and saturation levels of the video waveforms to transmit video information.

BRIEF DESCRIPTION OF THE DRAWINGS

These and other objects and the attendant advantages, features, and uses will become more apparent to those skilled in the art as a more detailed description proceeds when considered with the accompanying drawings in which.

DESCRIPTION OF THE PREFERRED EMBODIMENT

Figure 1:
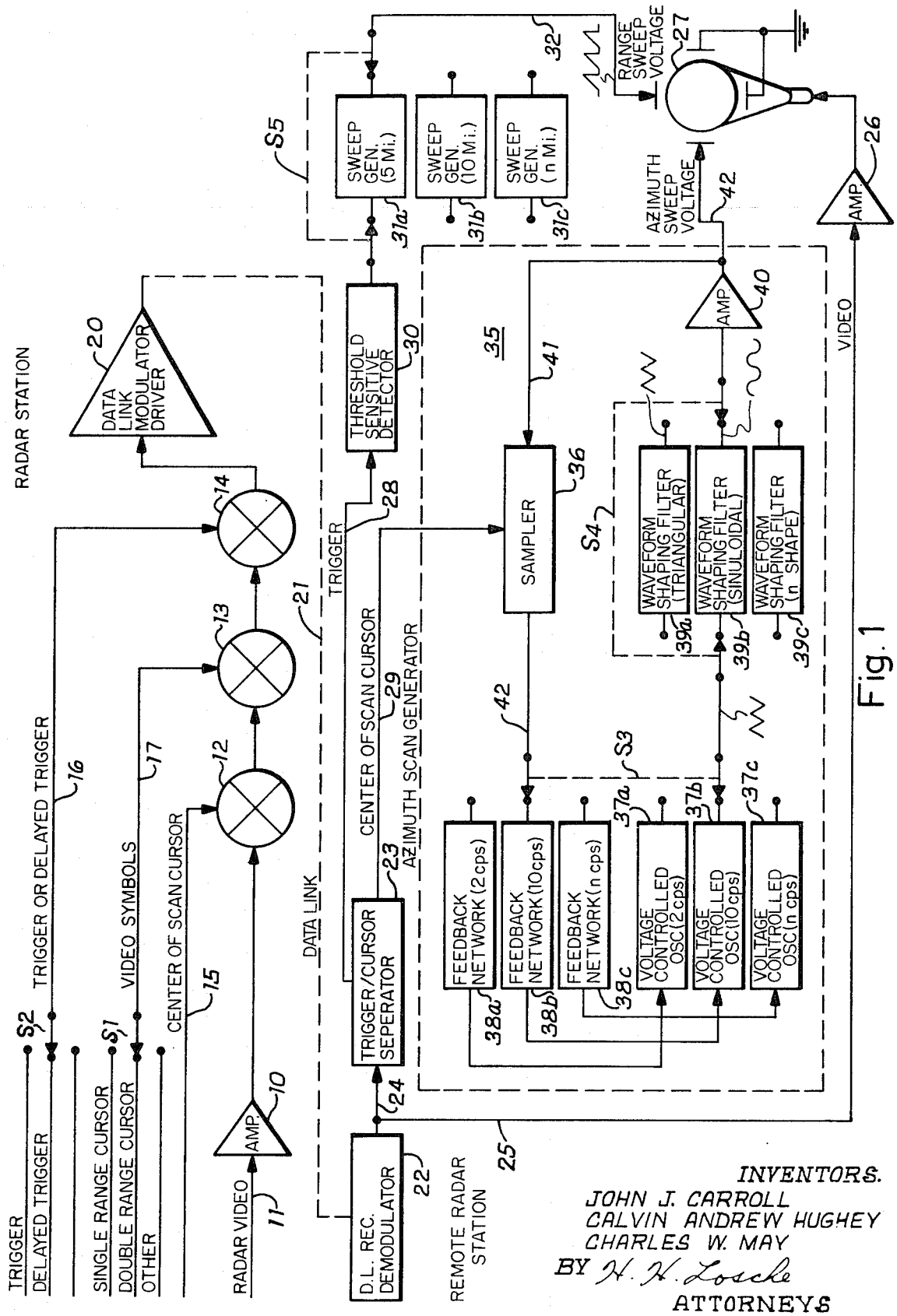
FIG. 1 is a block diagram of a part of the radar receiver station and all of the remote station of this invention.
Figure 3:
FIG. 3 illustrates a composite video waveform transmitted by the means of this invention.
Figure 4:
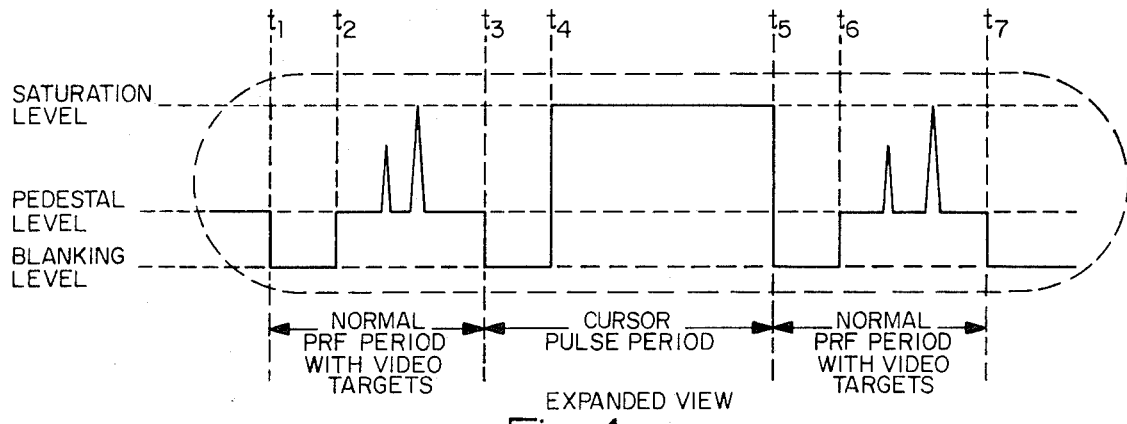
FIG. 4 illustrates an enlarged portion of the composite waveform of FIG. 3.
Figure 5:
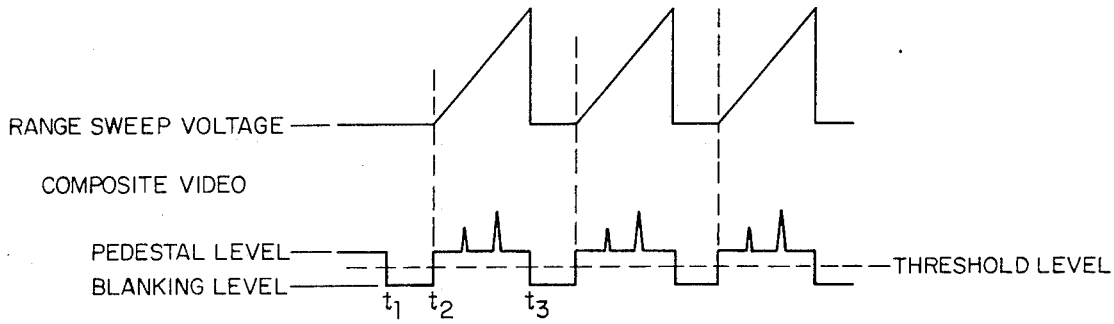
FIG. 5 shows a time relationship between composite video signals and range ramp voltage signals.

Referring more particularly to FIG. 1 with occasional reference to FIGS. 3, 4, and 5, there is illustrated in block circuit schematic diagram a portion of the radar receiver station, a data link, and the remote radar station of this invention. The radar video received by a radar receiver station (not completely shown) amplifies the video in an amplifier 10, the video signal being coupled thereto by a conductor means 11 from the radar receiver (not shown). The output of amplifier 10 is coupled through one or more mixers, three being 12, 13, and 14 shown herein to receive center of scan cursor pulses over the conductor 15, video symbols over the conductor 17, and trigger or delayed trigger pulses over the conductor 16 to the mixers, respectively. The video symbols may consist of single range cursor signals, double range cursor signals, or other type cursor signals through the selector switch S1. In like manner the trigger or delayed trigger pulses may be switched by a selector switch S2. Trigger or sync pulses, delayed trigger or sync pulses, or other type of sync pulses may be used, as desired, by selection of switch S2.

The radar antenna is constantly scanning left and right of the azimuth center line of the radar receiving station, which may be a ground station or an air station, as in an aircraft or the like. The direction directly forward of the radar set is usually designated as the azimuth center line. A sensor actuates a cursor pulse generator as the antenna crosses the center line driving from left to right to produce the center of scan cursor on conductor 15, as may be well understood by those skilled in the art. The period from one cursor pulse to the next is the azimuth scan period. Actuation of the cursor pulse generator produces a center of scan cursor pulse which is mixed with the radar video in mixer 12 to cause the composite video in the next PRF period, exclusive of the blanking period, to switch to the saturation level as shown from $t4$ to $t5$ in FIG. 4, and also illustrated in the dashed circle of FIG. 3 within the composite video waveform. In FIG. 4 the antenna going from left to right crosses the azimuth center line during the time between $t1$ and $t3$ but the following PRF period will contain the center of scan cursor $t4$ to $t5$. Accordingly, this center of scan cursor pulse will be transmitted in composite video waveform to the remote radar station.

Conductor 17 is connected to mixer 13 and video symbols are fed into mixer 13 and consist of either single range cursor symbols, or double range cursor symbols, depending upon the position of switch S1. These video symbols are mixed in mixer 13 with the output from mixer 12, which is a composite video waveform containing any video targets which are present; as shown in FIG. 4. A variety of video symbols may be generated and added to the composite video signals by means of conductor 17 and mixer 13 in FIG. 1.

Trigger or delayed trigger pulses are conducted by way of 16 and mixed with the video signals in the mixer 14 to reproduce the PRF periods illustrated by the falling edges $t1$, $t3$, and $t5$, as shown in FIG. 4. The composite video signal reoccurs each PRF period and is repeated many times with respect to the cursor pulse superimposed thereon, as more clearly illustrated in FIG. 3. By selecting the desired symbols and triggers through the setting of switches S1 and S2, different video symbols and different delays in the trigger pulse may be placed in the composite video signal.

At the radar station the RF signal is modulated by the radar composite video and amplified in the driver amplifier 20 for transmission over a data link 21 to the remote radar station. The data link 21 may be an actual conductor or conductor means or a radio link between the radar station and the remote radar station.

Figure 2:
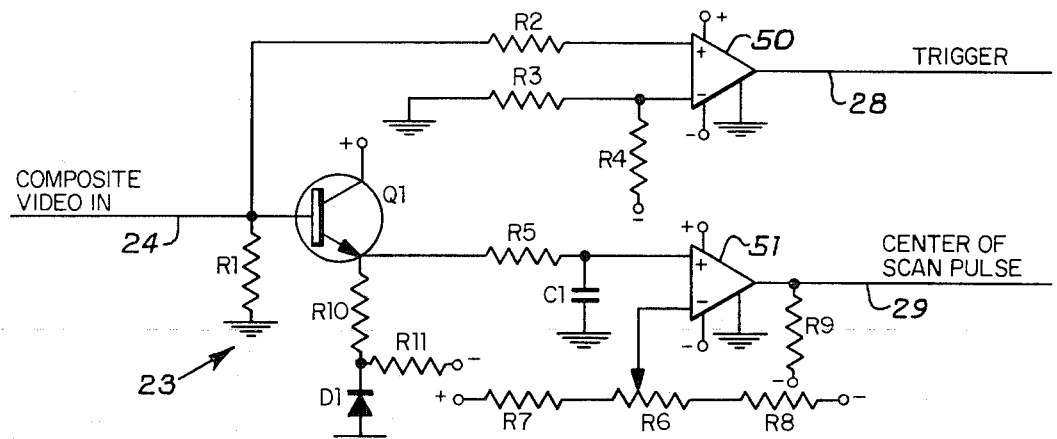
FIG. 2 is a circuit schematic of a trigger-cursor separator circuit shown in FIG. 1.

At the remote radar station the composite video signals will be demodulated from the RF carrier in a demodulator 22 to produce the composite video signal as seen in FIG. 3. The output of the demodulator 22 is by way of branch conductors 24 and 25 to a trigger cursor separator 23 and through a video amplifier 26 to the brightness control circuits of a radar scope 27 which may be a cathode ray tube designed for A-scope, B-scope, Sector PPI, depressed center PPI, or full PPI type presentation. The trigger-cursor separator 23 is more particularly described in detail with a circuit diagram as shown in FIG. 2 and, as will later be made clear, separates the center of scan cursor on the output 29 and the trigger pulses on the output 28. The output 28 of the separator 23 is conducted through a threshold sensitive detector 30 and through a selector switch S5 to one of the sweep generators 31a, 31b, or 31c depending on the position of the selector switch S5. The output of the sweep generator 31 is through a second stage of switch S5 by way of conductor 32 to the vertical or range sweep voltage control circuits of the radar scope 27. Range sweep generator 31a is calibrated to produce a 5 mile range on the radar scope 27, the range sweep generator 31b will provide a 10 mile range for the scope 27, and the sweep generator 31c may be calibrated for any other mileage scale to be presented on the radar scope 27. While three of these sweep generators are shown, it is to be understood that any number more or less than this may be used, if desired. The trigger pulses over conductor 28 will be applied to one of the sweep generators 31 through the threshold sensitive detector 30 which may set a threshold somewhere between the blanking level and the pedestal level, as shown in FIG. 5. The trigger pulses occurring at $t1$, $t3$, and $t6$ and delayed by the delayed triggers over conductor 16 cause the waveforms to go positive as sweep voltages at $t2$, $t4$, and $t6$ to produce the range sweep voltages, as shown in FIG. 5 and also illustrated above conductor 32. The slope of the ramp of sweep voltage, as shown in FIG. 5, illustrates the range coverage of the system. Range display limitations are constrained by the radar design or by the radar scope 27 and not by this invention.

The center of scan cursor sorted out by the separator 23 on the conductor 29 is applied to a phase sampler circuit 36 in an azimuth scan generator 35. The azimuth scan generator consists of the phase sampler circuit 36, a voltage control oscillator 37, feedback network filters 38, waveform shaping filters 39, and an amplifier 40 constituting a phase lock loop. The relatively narrow center of scan cursor operates as a gating pulse in the sampler circuit 36 which samples the crossover voltage thereby measuring the phase of the output of amplifier 40 in the feedback circuit 41 through sampler 36 and conductor 42 through selector switch S3 to the feedback network filters 38 to produce a correcting voltage on the selected voltage controlled oscillator 37. Three feedback network filters 38a, 38b, and 38c are shown herein which may be selected by switch S3. In like manner three voltage controlled oscillators 37a, 37b, and 37c are shown, the output of one being selected by the second stage of selector switch S3 to connect one of the waveform shaping filters 39. If switch S3 is placed at its top position, shown in FIG. 1, the feedback network filter 38a will band pass 2 cycles per second to the voltage controlled oscillator 37a, the output of which is selected by S3 to be applied to one of the waveform shaping filters. In the position shown for switch S3, the feedback network filter 38b for 10 cycles per second is applied to the voltage controlled oscillator 37b producing ten cycles per second and connected over switch S3 to one of the waveform shaping filters. The feedback network filter 38c and the voltage controlled oscillator 37c illustrates that other feedback filters and oscillators may be used where desired to obtain a particularly frequency. The voltage controlled oscillator 37 selected will produce a sawtooth voltage waveform on its output and herein illustrated as being connected through switch S4 to the waveform shaping filter 37b to produce a sinusoidal output waveform through switch S4 to the amplifier 40. The output of amplifier 40 is fed back by way of conductor 41 to the phase sampler 36 which compares the phase of the selected oscillator with the phase of the center of scan cursor to produce a correcting voltage which may be positive or negative to control the oscillator 37 in a direction to bring the phase of voltage over 41 and the position of the cursor over 29 to a zero phase condition and maintain it in this zero phase condition. This azimuth scan generator 35 accordingly operates as a phase lock loop since the output of the amplifier 40 is fed back to control the oscillator 37 to phase lock the azimuth scan.

The output of the amplifier 40 from the azimuth scan generator is conducted by branch conductor 42 to the horizontal deflection plate circuit of the radar scope 27 to provide azimuth scan sweep voltages for this indicator. The range sweep voltage over conductor 32 and the azimuth sweep voltage over conductor 42 to the radar scope 27 produces the sweep voltages to provide different mileage ranges and to provide different horizontal sweeps with selected waveforms such as a triangular waveform produced by shaping circuit 39a, the sinusoidal waveform as produced by 39b, or some other waveform shape as may be produced by 39c. In this manner the PRF of the radar station is transmitted to the remote radar station to produce the range sweep voltages while the phase lock loop or azimuth scan generator 35 essentially uses the center of scan cursor from the sync separator 23 to synchronize the electronic scan with the mechanical scan of the antenna located at the radar station.

Referring more particularly to FIG. 2, the trigger cursor separator 23 receives a composite video signal on the input 24 to produce the trigger output on 28 and the center scan pulse on the output 29. The input 24 is applied to the base electrode of an emitter follower Q1, the base of which is biased by resistor R1. The input 24 is also applied through a resistor R2 to one terminal of a differential amplifier 50 having its inverted electrode biased through resistors R3 and R4 from a negative voltage source to establish the threshold level as shown in FIG. 5 between the pedestal level and the blanking level. Accordingly, whenever the composite video signal traces from the blanking level to the pedestal level it will exceed the bias established by R3 and R4 in the differential amplifier to produce an output trigger pulse on 28. The emitter follower Q1 isolates the second path of the input signal 24 on the emitter of Q1 through a resistor R5 to one terminal of a second differential amplifier 51. This composite signal is developed across the resistor R10. The resistor R5 and capacitor C1 provide an integrator network to produce a voltage-time product which is a voltage that will exceed the threshold of the voltage determined by the setting of R6. The inverted input of amplifier 51 is from the adjustable tap of a potentiometer R6 which is coupled between resistors R7 and R8 in a circuit from positive and negative voltage, which may be in the order of 6 volts positive and 6 volts negative. This bias may be adjusted to some level between the pedestal level and the saturation level, as shown in FIG. 4, to trigger amplifier 51 and establish an output center of scan pulse on 29 whenever a cursor pulse is applied, as shown by t4 in FIG. 4. This signal is developed across a resistor R9 on the output 29. Resistors R10 and R11 as well as diode D1 establish the emitter bias for Q1. For one example of operation the following list of values may be used for this circuit.

| | |
|---|---|
| R1, R7, and R8 | 10,000 Ohms |
| R2, R3, R5, R10, and R11 | 1,000 Ohms |
| R4 | 3,000 Ohms |
| R6 | 5,000 Ohms |
| R9 | 4,300 Ohms |
| C1 | .047 μf |
| D1 | 1N3064 |
| Q1 | 2N2369 |

The differential amplifiers 50 and 51 may be of any well known commercial type which will compare voltages and produce an output when some preset voltage is exceeded. In this manner the trigger and center of scan pulses on conductors 28 and 29 are separated from the video composite signal applied over the data link 21 from the radar station.

OPERATION

In the operation of the above-described means of remotely displaying radar imagery in real time let it be assumed that the radar of the radar station is a pulsed type radar scanning in azimuth. The center of scan cursor pulse will be applied over the conductor 15 to the mixer 12 to be mixed with radar video which may contain radar targets, as shown by the two peaked pulses on top of the pedestal level in FIGS. 3, 4, and 5. A radar range cursor will be applied over conductor 17 to the mixer 13 to be further mixed with the video signals during the normal PRF period. Trigger pulses or delayed trigger pulses, as selected, will be conducted over conductor 16 to the mixer 14 and mixed with the video signal to form the composite video radar signals. This composite radar signal will be driven over the data link, illustrated in FIG. 1 by 21, which may be a radio link or actual wire conductors to the remote radar station, where it is demodulated and the trigger and center of scan cursor pulses separated out to produce the range sweep voltages and azimuth sweep voltages by the phase lock loop 35, respectively, on the radar scope 27. The target video signals and any other video signals introduced by way of conductor 17 to mixer 13 will operate the brightness control circuits of the scope 27 to paint these targets and symbols on the face of the radar scope 27, as well understood by those skilled in the radar receiving display arts. The composite video waveform between each PRF trigger occurs many thousands of times between each center of scan cursor pulse in the composite video waveform as shown in FIG. 3. However, the center of scan cursor pulses occur frequently enough to maintain the azimuth scan generator phase-locked to the azimuth scan frequency of the radar antenna. In this manner the remote station radar scope 27 will have the targets painted thereon in real time in the same manner as if this scope were at the radar station. The remote radar video information is reconstructed in real time over a single channel eliminating the necessity for additional modulators and demodulators and other circuitry which would be required for additional channels.

While the description hereinabove was given as a preferred embodiment using a pulsed type radar scanning in azimuth as an example, it is to be understood that this system will work with a variety of radar systems. In general, any radar indicator that will work with the selected radar system will work with this system. A data transmission is required to get the information from a remote site. Any single channel device is acceptable. This system imposes no restrictions to the radar display. It may be a full PPI display, a sector PPI display, a depressed center sector PPI display, an A-scope display, or a B-scope display.

While many modifications may be made to adapt the system to the different radar displays it is to be un-

We claim:
1. A circuit for remotely displaying radar imagery using a single data channel comprising:
a radar receiver having a radar video channel;
mixers in said radar video channel to mix center of scan cursor, range cursor, video symbols, and sync triggers producing composite video information in said channel;
a remote radar receiver station;
a data link coupled to transmit said composite video information to said remote radar receiver;
a demodulator and a video separator in said remote radar receiver for separating said composite video information into separate video, center of scan cursor, range cursor, and sync triggers;
a radar scope coupled to receive said video and said range cursor on a brightness control thereof;
an azimuth scan generator having a phase lock loop with a sampler network in a feedback loop to which is coupled said center of scan cursor to compare with the phase of said azimuth scan generator to produce error signals on the output of said sampler network operative to synchronize the horizontal voltage sweeps with said center of scan cursor, and
a vertical sweep generator coupled to receive said sync triggers to produce range sweep voltages coupled to the vertical deflection inputs of said radar scope whereby video target range information is displayed on said remote radar scope in real time over a single data channel.

2. A circuit for remotely displaying radar imagery as set forth in claim 1 wherein
said vertical sweep generator receives said sync triggers through a threshold sensitive detector to eliminate spurious noise signals from the sync trigger signals.

3. A circuit for remotely displaying radar imagery as set forth in claim 2 wherein
said video channel of said radar receiver includes an amplifier preceding said mixers and an amplifying driver succeeding said mixers to ably drive said composite video signals over said data link.

4. A circuit for remotely displaying radar imagery as set forth in claim 3 wherein
said azimuth scan generator includes a switched array of feedback network filters, a switched array of voltage controlled oscillators, and a switched array of waveform shaping filters in that coupled order between said sampler network and said output to said scope horizontal deflection circuits whereby different horizontal drive frequencies can be selectively switched to provide different scope range scales.

5. A circuit for remotely displaying radar imagery as set forth in claim 4 wherein
said video separator includes two channels isolated by a emitter follower transistor, each channel having a differential amplifier with a bias input to establish a threshold level, the threshold bias input for one channel being fixed to develop said sync triggers and the threshold bias input for the other channel being adjustable to develop center of scan cursor pulses of adjusted amplitude.

* * * * *